May 28, 1968  R. E. BRANDO  3,384,963
APPLE CORING TOOL
Filed Jan. 9, 1967
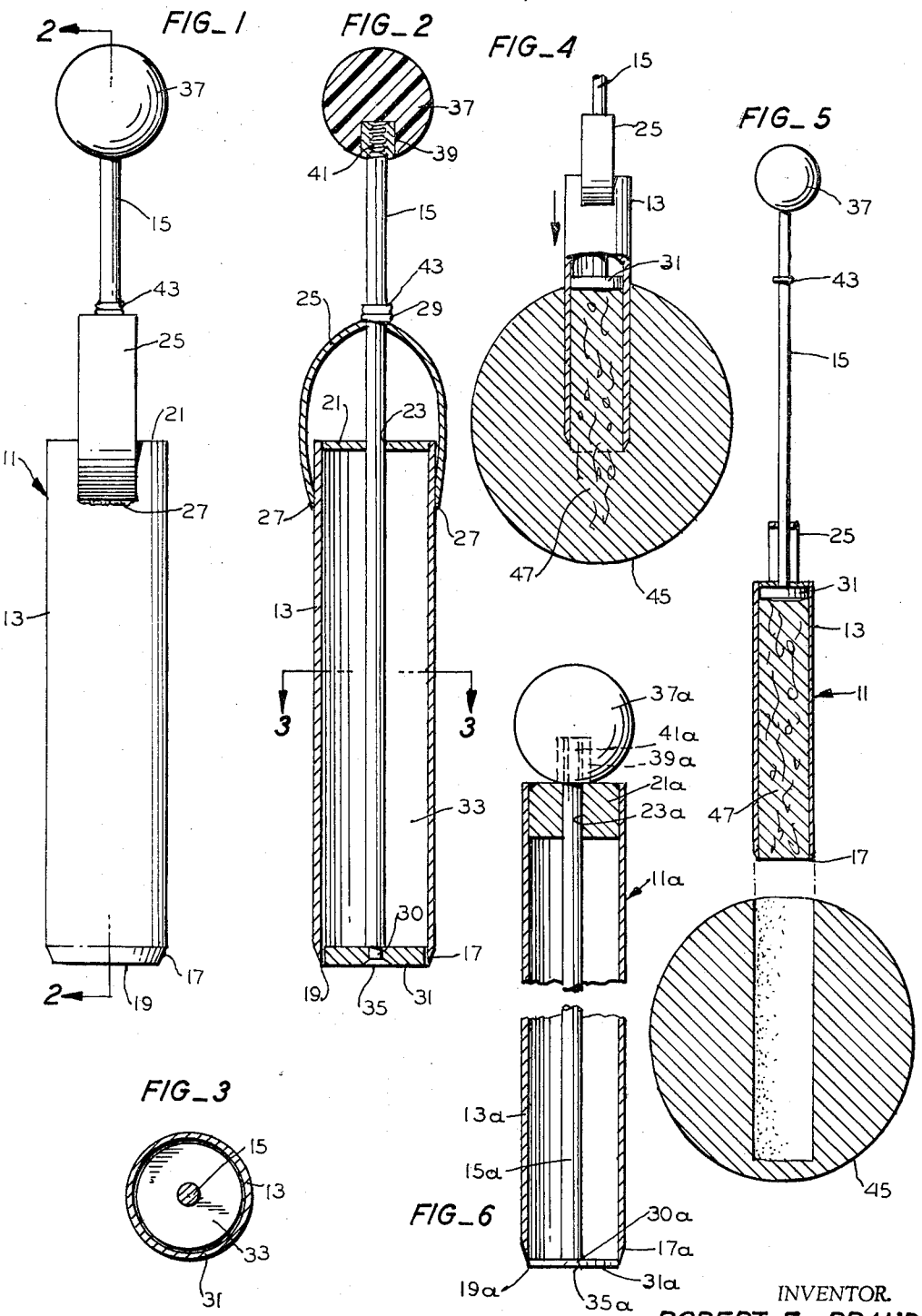
INVENTOR.
ROBERT E. BRANDO
BY Julian Caplan
ATTORNEY

United States Patent Office 3,384,963
Patented May 28, 1968

1

3,384,963
APPLE CORING TOOL
Robert E. Brando, 1800 N. Normandie Ave.,
Hollywood, Calif. 90027
Filed Jan. 9, 1967, Ser. No. 608,037
2 Claims. (Cl. 30—280)

ABSTRACT OF THE DISCLOSURE

An apple coring tool has a cylinder with a cutting edge at the bottom, a cap at the upper end, and a yoke extending above the cap. An ejector plug reciprocates inside the cylinder and has a rod extending up through the cap and yoke with a knob handle on its upper end.

---

This invention relates to a new and improved household tool for use in removing the core of fruits such as apples in preparation for baking.

A primary feature of the present invention is the fact that it provides simple, inexpensive and efficient means for coring apples.

Another feature of the present device is the fact that it provides in a single tool a means for removing the core from the fruit and means for easily ejecting the core from the tool once the tool and core are removed from the fruit.

Other objects of the present invention will become apparent upon reading the following specification and referring to the accompanying drawings.

In the drawings:

FIG. 1 is a side elevational view of an apple coring tool constructed in accordance with the present invention.

FIG. 2 is a longitudinal sectional view taken substantially along the line 2—2 of FIG. 1.

FIG. 3 is a transverse sectional view taken substantially along the line 3—3 of FIG. 2.

FIG. 4 is a side view partially broken away in section and in reduced scale showing the insertion of the tool into an apple.

FIG. 5 is a view similar to FIG. 4, showing the removal of the tool from the apple with the core held within the tool preliminary to being ejected.

FIG. 6 is a view similar to FIG. 2, of a modification.

In kitchen and household use it is common to remove the core from apples prior to baking. Previous coring tools of this general type have been unsuccessful because of difficulty in ejecting the core. The present fruit coring tool provides simple and effective means to core the fruit and eject the core from the tool. Fruit coring tool 11 is composed of two main portions: Thin-walled cylinder 13 and ejector rod 15. Metallic cylinder 13 is formed at its extreme lower end with beveled portion 17 with the wall of cylinder 13 tapered to terminate in sharp cutting edge 19. Closing cylinder 11 at its upper end is cap 21, which is formed with aperture 23 at its center. Ejector rod 15 is of a diameter to slide easily through aperture 23.

Yoke 25 is affixed at either end 27 to the outer walls of cylinder 13 near the upper end of the cylinder 13, as shown in FIG. 2.

Yoke 25 provides a finger hold for the operator to insert cutting cylinder 13 into the fruit and since it is also formed with aperture 29 for sliding movement of rod 15 it further acts to prevent wobbling of ejector rod 15.

2

Affixed at the lower extreme end of ejector rod 15 is ejector plug 31, which slides within chamber 33 in cylinder 13. Plug 31 is apertured to receive the reduced diameter lower end 30 of rod 15, which is staked or riveted, as indicated by reference numeral 35 at the underside of plug 31. Ejector plug 31 acts as a plunger to purge chamber 33 of a core therein. Affixed to the extreme upper end of ejector rod 15 is handle 37, preferably of ball shape. The end 41 of rod 15 is threaded to screw into socket 39 in ball 37. Handle 37 may be formed of plastic, metal, or other suitable material. Stop 43 is affixed to ejector rod 15 at a sufficient distance from handle 37, such that downward movement of rod 15 is stopped when plug 31 is flush with the lower end opening of cylinder 13, as shown in FIG. 2.

In use, the device is operated as follows: With handle 37 down (position of FIGS. 1 and 2), the operator grips the tool 11 and presses down on handle 37 to force cutting edge 19 of cylinder 13 into the fruit 45, which is to be cored. As coring continues, the user grips cylinder 13 and yoke 25, twisting as cutting edge 19 penetrates and allowing plug 31 to be elevated as the core 47 fills the cylinder (position of FIG. 4). Cylinder 13 is pushed downwardly into fruit 45 until lower cutting edge 19 is approximately near the extreme opposite end of fruit 45 (as in FIG. 5), so as to allow natural juices within the fruit to remain and not flow out through the opposite end. Of course, the tool may be used to penetrate entirely through the fruit if desired. Tool 11 is removed from fruit 45 by pulling yoke 25 upward to the position shown in FIG. 5. When so removed, core section 47 remains within cylinder 13 and is removed from fruit 45. Thereupon the operator grasps ball handle 37 while holding cylinder 13 or yoke 25 and forces rod 15 downwardly, causing ejector plug 31 to eject fruit core 47 from cylinder 13. The tool is then ready for re-use.

In FIG. 6, a modification omitting yoke 25 is illustrated, corresponding similar parts being designated by the same reference numerals, followed by subscript a. Plug 21a is of extended length, approximately one-half inch, and hole 23a fits with a relatively close sliding fit about rod 15a. Hence rod 15a is adequately guided at the upper end of tube 13a to maintain parallel alignment.

Although the foregoing invention has been described in some detail, by way of illustration and example for purposes of clarity of understanding, it is understood that certain changes in modification may be practiced within the spirit of the invention and scope of the appended claims.

What is clamed is:

1. A fruit coring tool comprising,
    a thin-walled cylinder having a lower cutting edge,
    a disc-shaped plunger sliding within said cylinder,
    a rod affixed to said plunger, said rod extending within said cylinder,
    a cap closing the upper end of said cylinder and formed with a first aperture, said rod longitudinally sliding within said first aperture,
    a handle affixed to the end of said rod opposite said plunger to enable an operator to grip said handle to extend said rod and said plunger within said cylinder to eject a fruit core within said cylinder,
    an inverted U-shaped yoke affixed at both ends to the outer wall of said cylinder substantially at said upper end of said cylinder, said yoke extending above said first end of said cylinder and above said cap, a second aperture formed in said yoke, said second aperture having a longituinal axis common to said aperture in said cap, said rod sliding within said first aperture and said second aperture along the longitudinal axis of said cylinder.

2. A fruit coring tool according to claim 1, in which said handle is substantially spheroidal in shape.

References Cited

UNITED STATES PATENTS

| | | | |
|---|---|---|---|
| 2,751,864 | 6/1956 | Parker | 146—52 X |
| 2,118,976 | 5/1938 | Larkin | 146—52 X |
| 1,692,436 | 11/1928 | Deane. | |
| 1,917,137 | 7/1933 | Marchio. | |
| 2,634,692 | 4/1953 | Sherbondy | 30—316 X |

JAMES L. JONES, JR., *Primary Examiner.*